United States Patent
Sugiyama

(10) Patent No.: US 10,746,924 B2
(45) Date of Patent: Aug. 18, 2020

(54) OPTICAL COMMUNICATION DEVICE AND OPTICAL MODULE

(71) Applicant: Fujitsu Optical Components Limited, Kawasaki-shi, Kanagawa (JP)

(72) Inventor: Masaki Sugiyama, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 461 days.

(21) Appl. No.: 15/178,945

(22) Filed: Jun. 10, 2016

(65) Prior Publication Data

US 2017/0038543 A1 Feb. 9, 2017

(30) Foreign Application Priority Data

Aug. 5, 2015 (JP) .................. 2015-154885

(51) Int. Cl.
*G02B 6/122* (2006.01)
*G02B 6/12* (2006.01)
*G02B 6/42* (2006.01)

(52) U.S. Cl.
CPC ......... *G02B 6/122* (2013.01); *G02B 6/12004* (2013.01); *G02B 6/42* (2013.01); *G02B 6/4213* (2013.01); *G02B 6/4215* (2013.01); *G02B 2006/12097* (2013.01)

(58) Field of Classification Search
CPC ...... G02B 6/122; G02B 6/12004; G02B 6/42; G02B 6/4213; G02B 6/4215; G02B 2006/12097
See application file for complete search history.

(56) References Cited

U.S. PATENT DOCUMENTS

| 6,498,666 B1 | 12/2002 | Asghari |
| 6,999,670 B1 * | 2/2006 | Gunn, III ................ G02F 1/025 |
| | | 385/131 |
| 2005/0053383 A1 | 3/2005 | West et al. |
| 2008/0137695 A1 | 6/2008 | Takahashi et al. |

(Continued)

FOREIGN PATENT DOCUMENTS

| JP | 9-219508 | 8/1997 |
| JP | 2002-500386 | 1/2002 |

(Continued)

OTHER PUBLICATIONS

Japanese Office Action dated Feb. 12, 2019 in corresponding Japanese Patent Application No. 2015-154885.

(Continued)

*Primary Examiner* — Georgia Y Epps
*Assistant Examiner* — Don J Williams
(74) *Attorney, Agent, or Firm* — Staas & Halsey LLP

(57) ABSTRACT

An optical communication device includes a support substrate, an optical waveguide, and a detector. The optical waveguide includes a first cladding layer that is formed on the support substrate, and is composed of silicon oxide or a material containing silicon oxide; a second cladding layer formed on the first cladding layer; and a core that is formed within the second cladding layer or between the first cladding layer and the second cladding layer, and is composed of silicon or a silicon-containing material. The detector contacts a part of the core, and is adapted to detect an intensity of light propagating through the core.

8 Claims, 9 Drawing Sheets

(56) References Cited

U.S. PATENT DOCUMENTS

| | | | |
|---|---|---|---|
| 2009/0022500 A1 | 1/2009 | Pinguet et al. | |
| 2011/0075962 A1 | 3/2011 | Block | |
| 2012/0288971 A1 | 11/2012 | Bogaerts et al. | |
| 2013/0287333 A1 | 10/2013 | Block | |
| 2015/0277043 A1* | 10/2015 | Shimizu | G02B 6/1228 385/14 |
| 2016/0043262 A1 | 2/2016 | Okumura | |
| 2016/0293788 A1 | 10/2016 | Okumura | |

FOREIGN PATENT DOCUMENTS

| | | |
|---|---|---|
| JP | 2007-501448 | 1/2007 |
| JP | 2008-147209 | 6/2008 |
| JP | 2011-27769 | 2/2011 |
| JP | 2011-76086 | 4/2011 |
| JP | 2012-256869 | 12/2012 |
| WO | 2014/171005 | 10/2014 |

OTHER PUBLICATIONS

Japanese Office Action dated Sep. 17, 2019 in corresponding Japanese Patent Application No. 2015-154885.

* cited by examiner

OPTICAL COMMUNICATION DEVICE AND OPTICAL MODULE

CROSS-REFERENCE TO RELATED APPLICATION

This application is based upon and claims the benefit of priority of the prior Japanese Patent Application No. 2015-154885, filed on Aug. 5, 2015, the entire contents of which are incorporated herein by reference.

FIELD

The embodiment discussed herein relates to an optical communication device and an optical module, adapted to send or receive optical signals.

BACKGROUND

Optical communication devices are known, each of which includes a core composed of a silicon material, and an optical waveguide containing silicon oxide and covering the core (refer to Japanese Laid-open Patent Application No. 2011-27769, for example). Referring to FIG. 1, an optical communication device includes an optical waveguide 91 adapted to propagate light to an external optical device, a coupler 92 adapted to split the light incoming from the optical waveguide 91, an optical waveguide 93 adapted to guide the light split by the coupler 92, and a detector 94 adapted to detect the intensity of the light guided through the optical waveguide 93, for example.

In the optical waveguide including the core composed of the silicon material, the index of refraction of light varies between silicon contained in the core and the silicon oxide contained in cladding. This provides a strong confinement of light, often resulting in scattering of the light on the wall surface of the core. Such scattering of light may increase an optical loss due to scattering per unit length of the optical waveguide (known as scattering loss).

Accordingly, such an increased optical loss in the optical waveguide 93 requires a sufficient amount of split light that is split at the coupler 92 (to the detector 94).

SUMMARY

In one aspect, an optical communication device is disclosed, which includes a support substrate; an optical waveguide including: a first cladding layer that is formed on the support substrate, and is composed of silicon oxide or a material containing silicon oxide; a second cladding layer formed on the first cladding layer; and a core that is formed within the second cladding layer or between the first cladding layer and the second cladding layer, and is composed of silicon or a silicon-containing material; and a detector that contacts a part of the core, and is adapted to detect an intensity of light propagating through the core.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENT

Figure 1:
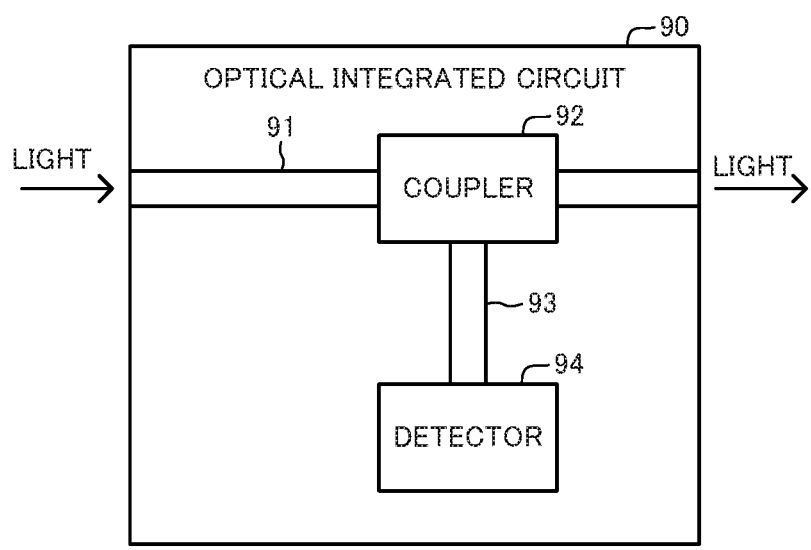
FIG. 1 is a block diagram illustrating one example of the configuration of an optical communication device.

Hereinafter, an embodiment will be described with reference to the drawings. It is understood that the embodiment discussed below is merely exemplary. Hence, applications of various modification and techniques that are not explicitly described below to the embodiment are not excluded. In the drawings that will be referred to in the below-described embodiment, elements referenced to by the like reference symbols denote the same or similar elements, unless any variations or modifications are indicated.

First Embodiment (Configurations)

Figure 2:
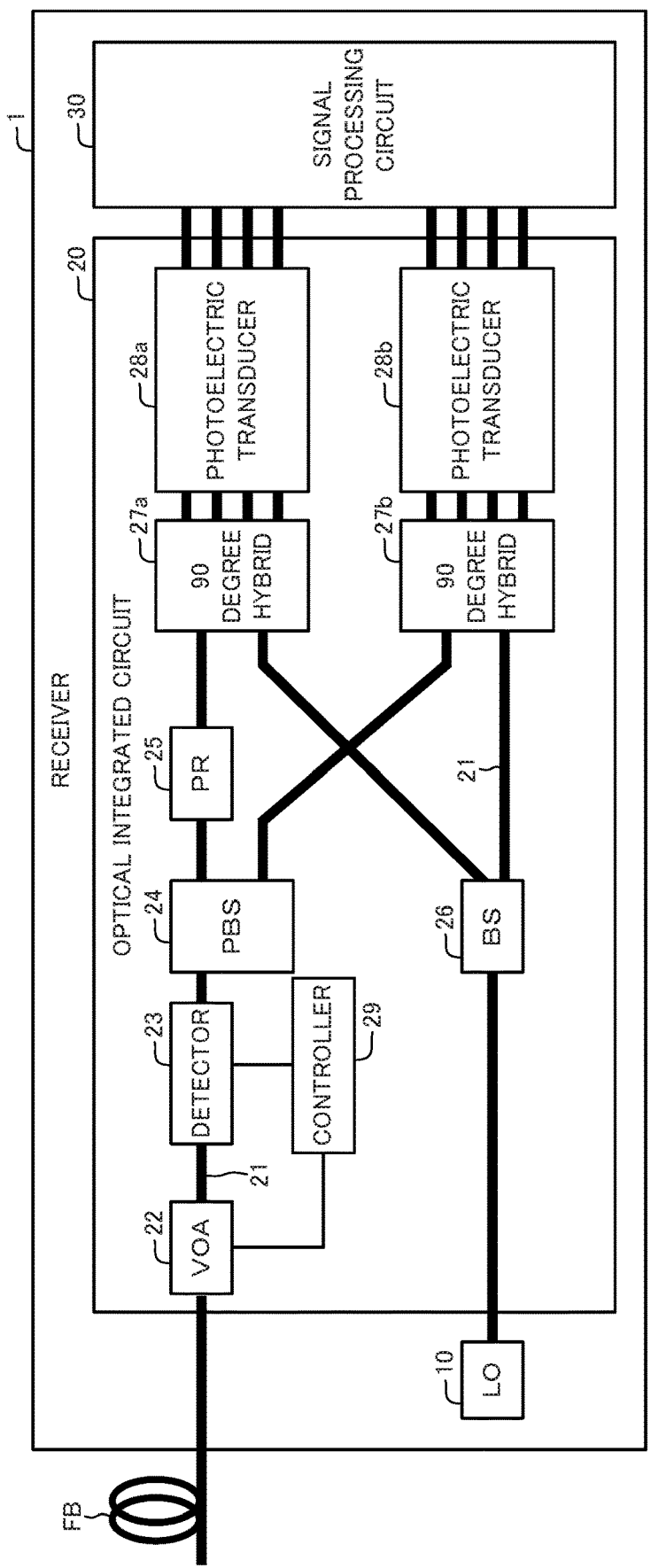
FIG. 2 is a block diagram illustrating one example of the configuration of a receiver of a first embodiment.

Referring to FIG. 2, a receiver 1 of a first embodiment includes a local oscillator (LO) 10, an optical integrated circuit 20, and a signal processing circuit 30, for example. The receiver 1 represents one example of an optical communication device. The optical integrated circuit 20 represents one example of an optical module. In this example, the receiver 1 is adapted to receive an optical signal, and processes the received optical signal, in accordance with a digital coherent optical communication scheme. The digital coherent optical communication scheme employs an optical polarization division multiplexing for multiplexing, for example. The optical polarization division multiplexing is the dual polarization quadrature phase shift keying (DP-QPSK), for example.

The LO 10 is adapted to output local oscillation light. The LO 10 is a semiconductor laser or a laser diode. The semiconductor laser may be a distributed feedback laser, for example.

In this example, the optical integrated circuit 20 is a monolithic optical integrated circuit. The optical integrated circuit 20 includes an optical waveguide 21, a VOA 22, a detector 23, a PBS 24, a PR 25, a BS 26, two optical 90 degree hybrids 27a and 27b, two photoelectric transducers 28a and 28b, and a controller 29.

The VOA is the abbreviation for a variable optical attenuator. The VOA 22 may also be referred to as the variable optical attenuator. The PBS is the abbreviation for a polarizing beam splitter. The PBS 24 may also be referred to as the polarizing beam splitter. The PR is the abbreviation for a polarization rotator. The PR 25 may also be referred to as the polarization rotator. The BS is the abbreviation for a beam splitter. The BS 26 may also be referred to as the beam splitter.

In this example, the optical waveguide 21 is a silicon wire optical waveguide. The optical waveguide 21 is adapted to connect the VOA 22 to the PBS 24. The optical waveguide 21 is also adapted to connect the PBS 24, to each of the PR 25 and the optical 90 degree hybrid 27b. The optical waveguide 21 is further adapted to connect the PR 25 to the optical 90 degree hybrid 27a. The optical waveguide 21 is also adapted to connect the optical 90 degree hybrid 27a to the photoelectric transducer 28a.

The optical waveguide 21 is further adapted to connect the BS 26, to each of the optical 90 degree hybrid 27a and the optical 90 degree hybrid 27b. The optical waveguide 21 also is adapted to connect the optical 90 degree hybrid 27b to the photoelectric transducers 28b.

Figure 3:
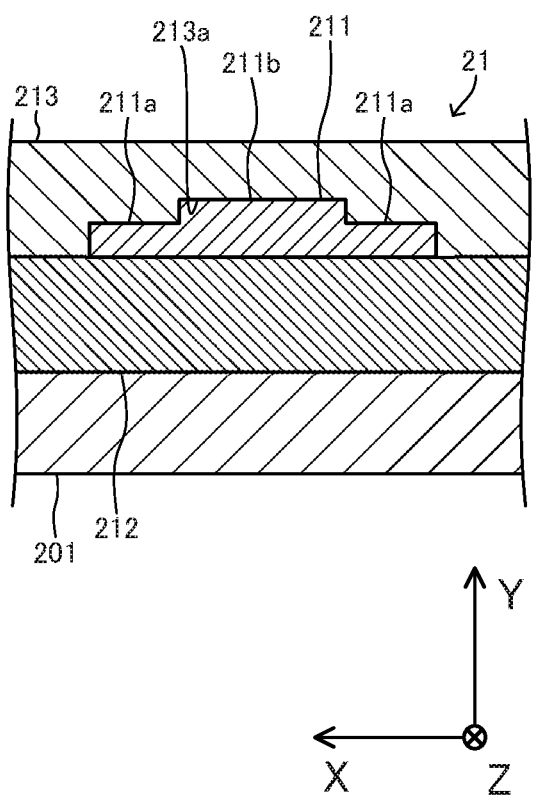
FIG. 3 is a diagram illustrating one example of the configuration of an optical waveguide in FIG. 2.

Referring to FIG. 3, the optical waveguide 21 will be described using the right-handed Cartesian coordinate system defined by the X, Y, and Z axes, for example. In this example, the optical waveguide 21 is adapted to propagate light in the direction along the Z axis (i.e., the Z-axis direction). In this example, a substrate 201 provided in the optical integrated circuit 20 extends orthogonal to the direction along the Y axis (i.e., the Y-axis direction).

As depicted in FIG. 3, the optical waveguide 21 includes a core 211, a first cladding 212, and a second cladding 213, for example. The first cladding 212 may also be referred to as the first cladding layer. The second cladding 213 may also be referred to as the second cladding layer.

In this example, the substrate 201 is composed of silicon (Si) or a silicon (Si) containing material. The substrate 201 may be composed of mono-crystalline silicon, for example. The substrate 201 may also be referred to as the support substrate.

The first cladding 212 is formed on the substrate 201. Specifically, the first cladding 212 is formed on the surface of the substrate 201 in a substantially uniform thickness (extending parallel to the substrate 201). In other words, the first cladding 212 has a planar configuration contacting the substrate 201. In this example, the first cladding 212 is composed of silicon oxide or a material including silicon oxide. The silicon oxide may be silicon dioxide ($SiO_2$), for example.

The core 211 is composed of silicon (Si) or a silicon (Si) containing material. The core 211 may be composed of mono-crystalline silicon, for example. The core 211 includes a base 211a serving as a base, and a rib 211b protruding from the base 211a in the direction opposite to the first cladding 212.

The base 211a extends parallel to the first cladding 212, and has a planar configuration contacting the first cladding 212. The base 211a has a rectangular shape in a cross-section of the core 211 on the plane orthogonal to the Z-axis direction (i.e., on the XY plane). The rectangular shape of the base 211a in the XY-plane cross-section of the core 211 has long sides in the direction along the X axis (i.e., X-axis direction), and short sides in the Y-axis direction. The length of the long sides of the base 211a in the XY-plane cross-section of the core 211 may also be referred to as the width of the base 211a.

The rib 211b extends parallel to the base 211a, and has a planar configuration contacting the base 211a. The rib 211b contacts the long sides of the base 211a in the center part of the long sides and has a rectangular shape, in the XY-plane cross-section of the core 211. The long sides of the base 211a where the rib 211b contacts the XY-plane cross-section of the core 211, represents one example of a first side.

The rectangular shape of the rib 211b in the XY-plane cross-section of the core 211 has long sides in the X-axis direction, and short sides in the Y-axis direction. In the XY-plane cross-section of the core 211, the line connecting the midpoints of the respective long sides of the rib 211b coincides with the line connecting the midpoints of the respective long sides of the base 211a, and extends parallel to the Y axis. The length of the long sides of the rib 211b in the XY-plane cross-section of the core 211 may also be referred to as the width of the rib 211b. The width of the rib 211b is smaller than the width of the base 211a.

The second cladding 213 is formed on the first cladding 212, for example. Specifically, the second cladding 213 is formed on the surface of the first cladding 212 in a substantially uniform thickness (extending parallel to the first cladding 212). In other words, the second cladding 213 has a planar configuration contacting the first cladding 212.

In this example, the second cladding 213 is composed of silicon oxide or a material containing silicon oxide. The silicon oxide may be silicon dioxide ($SiO_2$), for example.

The second cladding 213 includes a groove 213a having the same shape as that of the core 211, on the surface thereof on the side contacting the first cladding 212. The groove 213a in the second cladding 213 adjoins the core 211. In this manner, the core 211 is located between the first cladding 212 and the second cladding 213, and covered with the first cladding 212 and the second cladding 213.

The optical waveguide 21 may be fabricated by processing a silicon on insulator (SOI) substrate including a support substrate composed of silicon, an SOI, and a buried oxide (BOX) disposed between the support substrate and the SOI. In this case, the substrate 201 may be the support substrate, for example. In this case, the first cladding 212 may be the buried oxide. In this case, the core 211 may be formed by processing the SOI.

In this example, the optical waveguide 21 may also be referred to as the rib optical waveguide.

The VOA 22 is connected to a communication cable FB. In this example, the communication cable FB includes an optical fiber. The optical fiber is a single mode fiber (SMF), for example.

The VOA 22 is adapted to attenuate light incoming through the communication cable FB under the control of the controller 29, and output the attenuated light to the PBS 24 through the optical waveguide 21. The VOA 22 represents one example of a regulator adapted to regulate the intensity of the light introduced to the optical waveguide 21 that connects the VOA 22 and the PBS 24.

The detector 23 is provided at the optical waveguide 21 that connects the VOA 22 and the PBS 24. In other words, the detector 23 is provided at the optical waveguide 21 between the VOA 22 as a first optical element and the PBS 24 as a second optical element.

The detector 23 is adapted to detect the intensity (or energy) of light propagating through the core 211 in the optical waveguide 21. The PBS 24 represents one example of an optical element.

Figure 4:
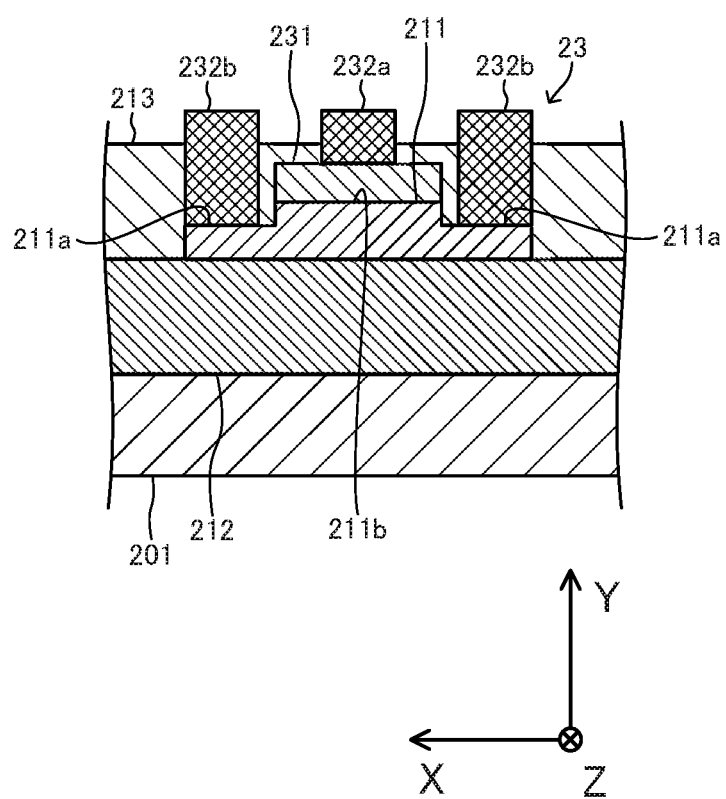
FIG. 4 is a diagram illustrating one example of the configuration of a detector in FIG. 2.

Referring to FIG. 4, the detector 23 will be described using the right-handed Cartesian coordinate system defined by the X, Y, and Z axes, for example. Also in this example, similarly to the configuration in FIG. 3, the optical waveguide 21 propagates light in the Z-axis direction. Furthermore, similarly to the configuration in FIG. 3, the substrate 201 provided in the optical integrated circuit 20 extends orthogonal to the Y-axis direction.

As depicted in FIG. 4, the detector 23 includes a semiconductor 231 and electrodes 232a and 232b, for example. In this example, the semiconductor 231 is composed of germanium (Ge). In this example, the electrodes 232a and 232b are composed of aluminum (Al).

The semiconductor 231 extends parallel to the rib 211b, and has a planar configuration contacting the rib 211b. The semiconductor 231 contacts the long sides of the rib 211b, and has a rectangular shape, in the XY-plane cross-section of the detector 23.

The rectangular shape of the semiconductor 231 in the XY-plane cross-section of the detector 23 has long sides in the X-axis direction, and short sides in the Y-axis direction. In the XY-plane cross-section of the detector 23, the line connecting the midpoints of the respective long sides of the semiconductor 231 coincides with the line connecting the midpoints of the respective long sides of the rib 211b, and extends parallel to the Y axis. The length of the long sides of the semiconductor 231 in the XY-plane cross-section of the detector 23 may also be referred to as the width of the semiconductor 231. The width of the semiconductor 231 equals the width of the rib 211b. The width of the semiconductor 231 represents one example of the length of the semiconductor 231 in the direction along the interface between the semiconductor 231 and the core 211 (in this example, in the X-axis direction).

Figure 5:
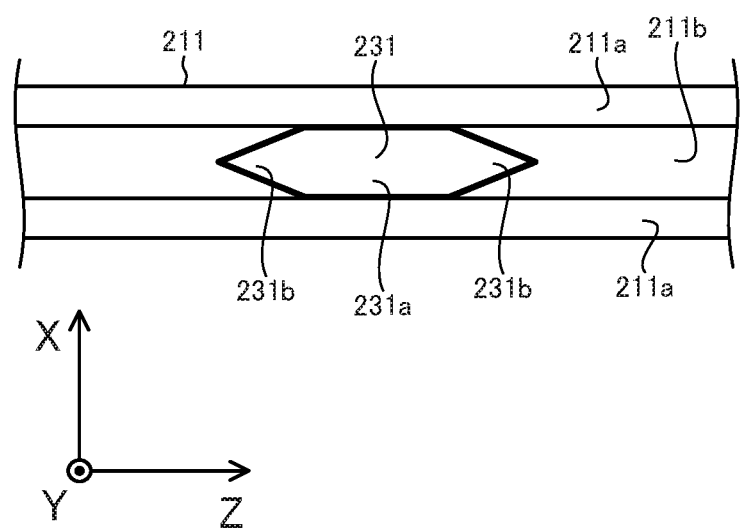
FIG. 5 is a diagram illustrating one example of the configuration of the detector in FIG. 2.

Referring to FIG. 5, in this example, the Z-axis direction length of the semiconductor 231 is shorter than the Z-axis direction length of the optical waveguide 21 (in this example, the distance between the VOA 22 and the PBS 24). FIG. 5 is the diagram when the core 211 and the semiconductor 231 are viewed in the Y-axis negative direction along the Y axis in FIG. 4 (i.e., Y-axis negative direction).

Furthermore, in this example, as depicted in FIG. 5, the width of the semiconductor 231 continuously varies along the Z-axis direction. In this manner, the semiconductor 231 is shaped so as to continuously vary the index of refraction of the optical waveguide 21 along the propagation direction of light through the core 211.

In this example, the semiconductor 231 includes a base 231a that is the Z-axis direction center part and tapered sections 231b that are the Z-axis direction ends. The X-axis direction length of the base 231a (i.e., the width of the base 231a) equals the width of the rib 211b. An X-axis direction length of the tapered sections 231b (i.e., the width of the tapered sections 231b) equals the value obtained by subtracting a length that is proportional to the distance from the base 231a, from the width of the rib 211b.

In this manner, the semiconductor 231 contacts the rib 211b to form a photodiode together with the core 211.

For example, as depicted in FIG. 4, the electrode 232a contacts the semiconductor 231, but does not contact the core 211. The electrodes 232b contact the base 211a of the core 211, but do not contact the semiconductor 231. In this example, the electrode 232a and the electrodes 232b are controlled to different electric potentials. This permits the electrodes 232a and 232b to apply a voltage to the photodiode.

The Z-axis direction length of the semiconductor 231 is selected such that the ratio of the intensity (or energy) consumed by the photodiode, to the intensity (or energy) of light propagating through the core 211 becomes a certain target value, for example. The target value is a value ranging from 3% to 20%, more preferably, from 5% to 10%, for example.

As depicted in FIG. 2, the PBS 24 splits the light incoming from the VOA 22, into first and second polarized waves that are orthogonal to each other. In this example, the first and second polarized waves are a transverse magnetic (TM) wave and a transverse electric (TE) wave, respectively, for example. The PBS 24 is adapted to output the first and second polarized waves to the PR 25 and the optical 90 degree hybrid 27b, respectively.

The PR 25 is adapted to rotate the polarization plane of the first polarized wave incoming from the PBS 24 by 90 degrees, and output the first polarized wave of which the polarization plane has been rotated, to the optical 90 degree hybrid 27a.

The BS 26 is adapted to receive local oscillation light from the LO 10. The BS 26 is adapted to split the received local oscillation light into two beams, and output the two split beams, to the respective optical 90 degree hybrids 27a and 27b.

The optical 90 degree hybrid 27a is adapted to multiplex the light incoming from the PR 25 with the light incoming from the BS 26, and output the multiplexed signal to the photoelectric transducer 28a. The multiplexing of light may also be referred to as light mixing. In this example, the optical 90 degree hybrid 27a is adapted to split the light incoming from the BS 26 into two light beams, and multiplex the two split light beams with the light incoming from the PR 25, at two respective positions where the phases of light are different by 90 degrees.

The optical 90 degree hybrid 27b is adapted to multiplex the light incoming from the PBS 24 with the light incoming from the BS 26, and output the multiplexed signal to the photoelectric transducer 28b. In this example, the optical 90 degree hybrid 27b is adapted to split the light incoming from the BS 26 into two light beams, and multiplex the two split light beams with the light incoming from the PBS 24, at two respective positions where the phases of light are different from each other by 90 degrees.

The photoelectric transducer 28a is adapted to convert the respective signals incoming from the optical 90 degree hybrid 27a, from the optical signals to electric signals, and output the converted signals to the signal processing circuit 30. The conversion from optical signals to electric signals may also be referred to as photoelectric conversion. Similarly, the photoelectric transducer 28b converts the respective signals incoming from the optical 90 degree hybrid 27b, from the optical signals to electric signals, and output the converted signals to the signal processing circuit 30.

The controller 29 is adapted to control the VOA 22 in accordance with the intensity (or energy) of the light detected by the detector 23. For example, the controller 29 feedback-controls the attenuation factor in the VOA 22 such that the intensity of the light detected by the detector 23 becomes a certain target value. The attenuation factor is the ratio of the intensity (or energy) of light exited from the VOA 22, to the intensity (or energy) of light introduced to the VOA 22.

The signal processing circuit 30 is adapted to process signals incoming from the optical integrated circuit 20.

(Operations)

Operations of the receiver 1 will be described.

The VOA 22 receives light through the communication cable FB. The VOA 22 attenuates the received light under the control of the controller 29, and outputs the attenuated light to the PBS 24 through the optical waveguide 21.

The detector 23 detects the intensity of light propagating from the VOA 22 to the PBS 24 through the optical waveguide 21. In this example, the detector 23 detects the intensity of light by converting the intensity (or energy) of a part of light propagating through the optical waveguide 21, into an electric signal (e.g., an electric current).

The controller 29 feedback-controls the attenuation factor of the VOA 22 in accordance with the intensity of the light detected by the detector 23.

The PBS 24 splits the light attenuated by the VOA 22 into first and the second polarized waves that are orthogonal to each other, and outputs the first and second polarized waves to the PR 25 and the optical 90 degree hybrid 27b, respectively.

The PR 25 rotates the polarization plane of the first polarized wave incoming from the PBS 24 by 90 degrees, and outputs the first polarized wave of which the polarization plane has been rotated, to the optical 90 degree hybrid 27a.

The BS 26 receives the local oscillation light exited from the LO 10. The BS 26 splits the received local oscillation light into two light beams, and outputs the two split light beams to the optical 90 degree hybrids 27a and 27b, respectively.

The optical 90 degree hybrid 27a multiplexes the light incoming from the PR 25 with the light incoming from the BS 26, and outputs the multiplexed signal to the photoelectric transducer 28a. Similarly, the optical 90 degree hybrid 27b multiplexes the light incoming from the PBS 24 with the light incoming from the BS 26, and outputs the multiplexed signal to the photoelectric transducer 28b.

The photoelectric transducer 28a converts the respective signals incoming from the optical 90 degree hybrid 27a, from the optical signals to electric signals, and outputs the converted signals to the signal processing circuit 30. Similarly, the photoelectric transducer 28b converts the respective signals incoming from the optical 90 degree hybrid 27b, from the optical signals to electric signals, and outputs the converted signals to the signal processing circuit 30.

The signal processing circuit 30 processes the signals incoming from the photoelectric transducers 28a and 28b.

As described above, the receiver 1 processes light incoming through the communication cable FB, in accordance with a digital coherent optical communication scheme.

As set forth above, the receiver 1 of the first embodiment includes the support substrate 201, the optical waveguide 21, and the detector 23. The optical waveguide 21 includes the first cladding layer 212 that is formed on the support substrate 201, and is composed of silicon oxide or a material containing silicon oxide; the second cladding layer 213 formed on the first cladding layer 212; and the core 211 that is formed in the second cladding layer 213 or between the first cladding layer 212 and the second cladding layer 213, and is composed of silicon or a silicon-containing material. The detector 23 contacts a part of the core 211 and is adapted to detect the intensity of light propagating through the core 211.

This configuration enables the intensity of light propagating through the optical waveguide 21 to be detected without a coupler. This helps to eliminate the scattering loss at a coupler, and can contribute to a reduction in the optical loss in the optical integrated circuit 20.

Furthermore, in an optical integrated circuit having a coupler, a highly precise detection of the intensity of light may not be achieved unless the position and the rotation angle of the detector are adjusted precisely relative to the propagation direction of light split by the coupler, for example. In contrast, in accordance with the optical integrated circuit 20, the intensity of light can be detected in a high precision.

Furthermore, in the first embodiment, the base 211a of the core 211 has a rectangular shape in the cross-section of the core 211 on the plane orthogonal to the propagation direction of light through the core 211. Furthermore, the rib 211b of the core 211 contacts the first side of the base 211a in the center part of the first side and has a rectangular shape, in the cross-section of the core 211.

This helps to reduce any optical loss incurred in light propagation through the optical waveguide 21 (i.e., propagation loss), as compared to a configuration where the core 211 includes only the base 211a (i.e., a configuration where the optical waveguide is a channel optical waveguide). This results in a reduction in the optical loss in the optical integrated circuit 20.

Furthermore, in the first embodiment, the detector 23 includes the semiconductor 231 that contacts the rib 211b to form a photodiode together with the core 211, and the electrodes 232a and 232b adapted to apply a voltage to the photodiode.

Furthermore, in the first embodiment, the semiconductor 231 is shaped to continuously vary the index of refraction of the optical waveguide 21 along the propagation direction of light through the core 211.

In an optical waveguide where the index of refraction thereof discontinuously varies along the propagation direction of light through the core, the scattering loss is often increased at the point of the optical waveguide where the index of refraction discontinuously varies. In contrast, in accordance with the optical integrated circuit 20, the reduction in the scattering loss in the optical waveguide 21 leads to a reduction in the optical loss in the optical integrated circuit 20.

Furthermore, in the first embodiment, the semiconductor 231 has the length in a direction along the interface between the semiconductor 231 and the core 211 in the cross-section of the semiconductor 231 on the plane orthogonal to the propagation direction of the light through the core 211, and the length of the semiconductor 231 continuously varies along the propagation direction of the light through the core 211.

In accordance with this configuration, it is possible to continuously vary the index of refraction of the optical waveguide 21 along the propagation direction of light through the core 211. This can contribute to a reduction in the optical loss in the optical integrated circuit 20.

Figure 6:
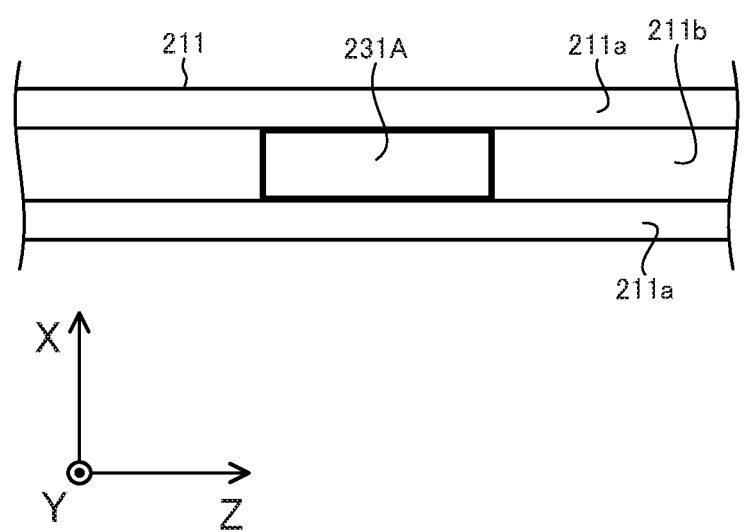
FIG. 6 is a diagram illustrating one example of the configuration of a detector of a modification to the first embodiment.

In place of the semiconductor 231, the detector 23 may include a semiconductor 231A, as depicted in FIG. 6. The width of the semiconductor 231A discontinuously varies along the Z-axis direction. In this example, the width of the semiconductor 231A equals the width of the rib 211b.

Figure 7:
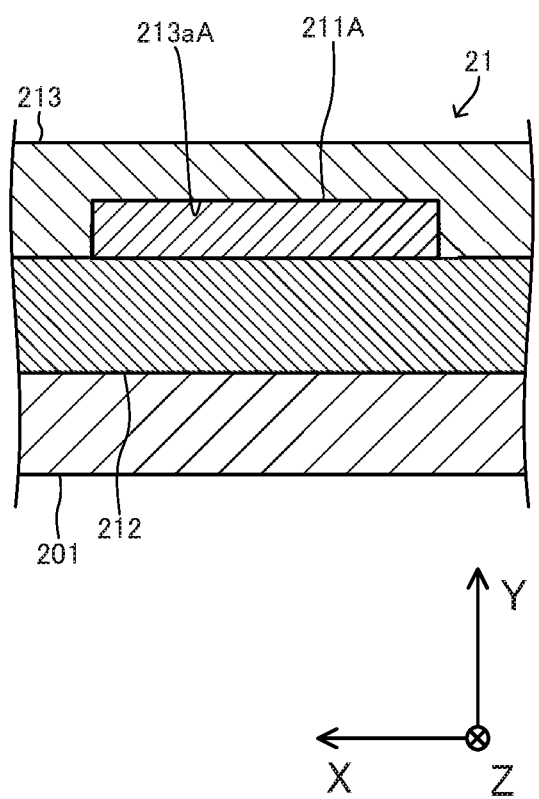
FIG. 7 is a diagram illustrating one example of the configuration of an optical waveguide of the modification to the first embodiment.

Furthermore, in place of the core 211, the optical waveguide 21 may include a core 211A, as depicted in FIG. 7. In this case, in place of the groove 213a, the second cladding 213 may include a groove 213aA.

The core 211A extends parallel to the first cladding 212, and has a planar configuration contacting the first cladding 212. The core 211A has a rectangular shape in the XY-plane cross-section of the core 211A. In the XY-plane cross-section of the core 211A, the rectangular shape of the core 211A has long sides in the X-axis direction, and short sides in the Y-axis direction. The length of the long sides of the core 211A in the XY-plane cross-section of the core 211A may also be referred to as the width of the core 211A.

The groove 213aA has the same shape as that of the core 211A in the XY-plane cross-section of the core 211A. The groove 213a in the second cladding 213 adjoins the core 211A. In this manner, the core 211A is covered with the first cladding 212 and the second cladding 213.

In this case, the optical waveguide 21 may also be referred to as the channel optical waveguide.

Figure 8:
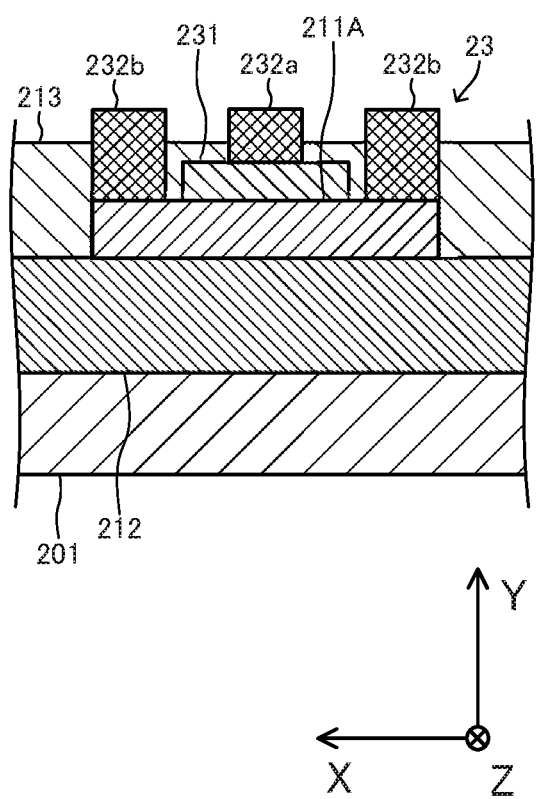
FIG. 8 is a diagram illustrating one example of the configuration of a detector of the modification to the first embodiment.

Further, in this case, the semiconductor 231 contacts the long sides of the core 211A and has a rectangular shape, in the XY-plane cross-section of the detector 23, as depicted in FIG. 8. In the XY-plane cross-section of the detector 23, the line connecting the midpoints of the respective long sides of the semiconductor 231 coincides with the line connecting the midpoints of the respective long sides of the core 211A, and extends parallel to the Y axis. The length of the long sides of the semiconductor 231 in the XY-plane cross-section of the detector 23 may also be referred to as the width of the semiconductor 231. The width of the semiconductor 231 is shorter than the width of the core 211A. The width of the semiconductor 231 represents one example of the length of the semiconductor 231 in the direction along the interface between the semiconductor 231 and the core 211A (in this example, X-axis direction).

Further, in this case, as depicted in FIG. 8, the electrode 232a contacts the semiconductor 231, but does not contact the core 211A. The electrodes 232b contact the core 211A, but do not contact the semiconductor 231.

Even when a channel optical waveguide is employed as the optical waveguide 21, the intensity of light propagating through the optical waveguide 21 can be detected without a coupler. Accordingly, the elimination of a coupler prevents occurrence of any scattering loss, which can contribute to a reduction in the optical loss in the optical integrated circuit 20.

Figure 9:
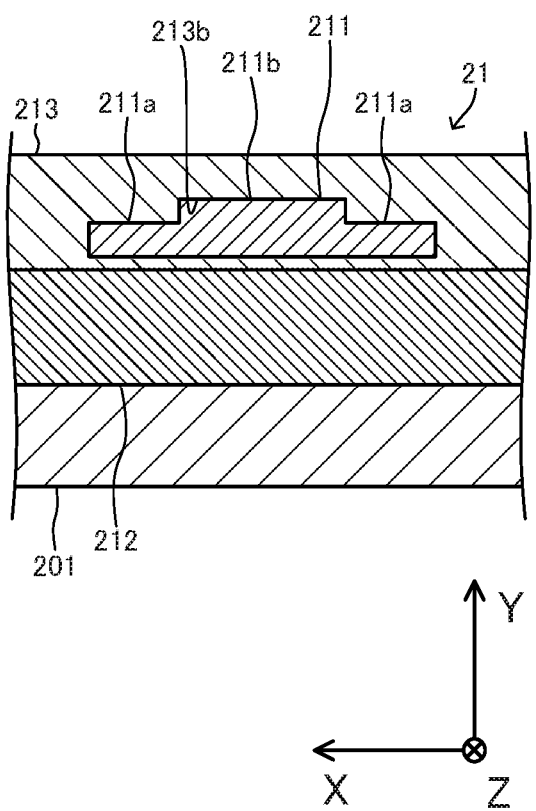
FIG. 9 is a diagram illustrating one example of the configuration of an optical waveguide of the modification to the first embodiment.

Furthermore, in place of the groove 213a, the second cladding 213 includes a through-hole 213b penetrating through the second cladding 213 in the direction along the Z axis, as depicted in FIG. 9. The through-hole 213b has the same shape as that of the core 211. The core 211 is disposed within the through-hole 213b. In this manner, the core 211 is disposed within the second cladding 213, and is covered with the second cladding 213. Even in this case, the intensity of light propagating through the optical waveguide 21 can be detected without a coupler. Accordingly, the elimination of a coupler prevents occurrence of any scattering loss, which can contribute to a reduction in the optical loss in the optical integrated circuit 20.

The optical integrated circuit 20 of the first embodiment is applied to the receiver 1 adapted to receive optical signals. The optical integrated circuit 20 may also be applied to a transmitter adapted to optical signals. In this case, in place of the VOA 22, the optical integrated circuit 20 includes an amplifier adapted to amplify light under the control of the controller 29, and the detector 23 may detect the intensity of light amplified by the amplifier. Further, in this case, the controller 29 may control the amplification factor of the amplifier in accordance with the intensity of the light detected by the detector 23. The amplification factor is the ratio of the intensity (or energy) of light exited from an amplifier, to the intensity (or energy) of light introduced to the amplifier. In this case, the amplifier represents one example of a regulator.

In this case, the amplifier may receive light modulated by a modulator, for example. In this case, the amplifier may output the amplified light to an optical element (e.g., optical 90 degree hybrid) through an optical waveguide, for example.

Further, in this case, the amplifier may receive light exited from a laser (e.g., a tunable laser), for example. In this case, the amplifier may output the amplified light to an optical element (e.g., modulator) through an optical waveguide, for example.

An optical loss optical in a communication device is reduced.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiment(s) of the present invention have been described in detail, it should be understood that the various changes, substitutions, and alterations could be made hereto without departing from the spirit and scope of the invention.

What is claimed is:

1. An optical communication device comprising:
   a support substrate;
   an optical waveguide comprising:
      a first cladding layer that is formed on the support substrate, and is composed of silicon oxide or a material containing silicon oxide;
      a second cladding layer formed on the first cladding layer; and
      a core that is formed within the second cladding layer or between the first cladding layer and the second cladding layer, and is composed of silicon or a silicon-containing material; and
   a detector that contacts a part of the core, is interposed in the optical waveguide, comprises an input waveguide and an output waveguide, and is adapted to detect an intensity of light propagating through the core, wherein:
   the core comprises:
   a base having a rectangular shape in a cross-section of the core on a plane orthogonal to a propagation direction of the light through the core; and
   a rib that contacts a first side of the base at a center of the first side, has a rectangular shape, in the cross-section of the core, and protrudes from the base in a direction opposite to the first cladding layer;
   the detector comprises:
   a semiconductor that contacts the core to form a photodiode together with the core; and
   electrodes adapted to apply voltage to the photodiode; and
   the semiconductor has a structure comprising a base having a uniform sectional area along a longitudinal propagation direction, a first tapered section being disposed upstream in the longitudinal propagation direction of the base and having a sectional area being narrower as separating from the base, and a second tapered section being disposed downstream in the longitudinal propagation direction of the base and having a sectional area and being narrower as separating from the base, the first tapered section, the base, and the second tapered section being arranged along the longitudinal propagation direction, and the structure varies an index of refraction of the optical waveguide.

2. The optical communication device according to claim 1, wherein the detector comprises:
   a semiconductor that contacts the rib to form a photodiode together with the core; and
   electrodes adapted to apply voltage to the photodiode.

3. The optical communication device according to claim 1, wherein the semiconductor has a length in a direction along an interface between the semiconductor and the core in a cross-section of the semiconductor on the plane orthogonal to the propagation direction of the light through the core, the length of the semiconductor continuously varying along the propagation direction of the light through the core.

4. The optical communication device according to claim 1, further comprising:
   a regulator adapted to regulate an intensity of the light to be introduced to the optical waveguide; and
   a controller adapted to control the regulator, in accordance with the intensity of the detected light.

5. An optical module comprising:
   a support substrate;
   an optical waveguide comprising:
      a first cladding layer that is formed on the support substrate, and is composed of silicon oxide or a material containing silicon oxide;
      a second cladding layer formed on the first cladding layer; and
      a core that is formed within the second cladding layer or between the first cladding layer and the second cladding layer, and is composed of silicon or a silicon-containing material; and
   a detector that contacts a part of the core, is interposed in the optical waveguide, comprises an input waveguide and an output waveguide, and is adapted to detect an intensity of light propagating through the core, wherein:
   the core comprises:
   a base having a rectangular shape in a cross-section of the core on a plane orthogonal to a propagation direction of the light through the core; and
   a rib that contacts a first side of the base at a center of the first side, has a rectangular shape, in the cross-section of the core, and protrudes from the base in a direction opposite to the first cladding layer; and
   the detector comprises:
      a semiconductor that contacts the core to form a photodiode together with the core; and
   electrodes adapted to apply voltage to the photodiode; and
   the semiconductor has a structure comprising a base having a uniform sectional area along a longitudinal propagation direction, a first tapered section being disposed upstream in the longitudinal propagation direction of the base and having a sectional area being narrower as separating from the base, and a second tapered section being disposed downstream in the longitudinal propagation direction of the base and having a sectional area and being narrower as separating from the base, the first tapered section, the base, and the second tapered section being arranged along the longitudinal propagation direction, and the structure varies an index of refraction of the optical waveguide.

6. The optical module according to claim 5, wherein the detector comprises:
   a semiconductor that contacts the rib to form a photodiode together with the core; and
   electrodes adapted to apply voltage to the photodiode.

7. The optical module according to claim 5, wherein the semiconductor has a length in a direction along an interface between the semiconductor and the core in a cross-section of the semiconductor on the plane orthogonal to the propagation direction of the light through the core, the length of the semiconductor continuously varying along the propagation direction of the light through the core.

8. The optical module according to claim 5, further comprising:
   a regulator adapted to regulate an intensity of the light to be introduced to the optical waveguide; and
   a controller adapted to control the regulator, in accordance with the intensity of the detected light.

* * * * *